US012647447B2

(12) United States Patent　　　(10) Patent No.: US 12,647,447 B2
Skarda et al.　　　　　　　　　　　(45) Date of Patent: Jun. 2, 2026

(54) PREDICTIVE MODELS FOR EXTENDED DETECTION AND RESPONSE (XDR) SYSTEMS

(71) Applicant: Cisco Technology, Inc., San Jose, CA (US)

(72) Inventors: Cenek Skarda, Praha Bechovice (CZ); Josef Krupicka, Mnisek pod Brdy (CZ); Michal Svoboda, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 18/454,688

(22) Filed: Aug. 23, 2023

(65) Prior Publication Data

US 2024/0354399 A1　　Oct. 24, 2024

Related U.S. Application Data

(60) Provisional application No. 63/461,396, filed on Apr. 24, 2023.

(51) Int. Cl.
*H04L 9/40*　　　　(2022.01)
*G06F 21/55*　　　(2013.01)

(52) U.S. Cl.
CPC ........ *H04L 63/1433* (2013.01); *G06F 21/552* (2013.01); *H04L 63/1416* (2013.01); *H04L 63/1425* (2013.01)

(58) Field of Classification Search
CPC ............. H04L 63/1433; H04L 63/1425; H04L 63/1416; H04L 63/1441; G06F 21/554;
(Continued)

(56)　　　　　References Cited

U.S. PATENT DOCUMENTS 9,635,049 B1　4/2017 Oprea et al.
10,009,358 B1　6/2018 Xie et al.
(Continued)

FOREIGN PATENT DOCUMENTS

CN　　102185735 A　　9/2011
CN　　111949641 A　* 11/2020　........... G06F 16/275
(Continued)

OTHER PUBLICATIONS

Azeez et al., "Windows PE Malware Detection Using Ensemble Learning," Informatics (8): 2021, 22 pages.
(Continued)

*Primary Examiner* — Catherine Thiaw
*Assistant Examiner* — Amir Mahdi Hajiabbasi
(74) *Attorney, Agent, or Firm* — Lee & Hayes, P.C.

(57)　　　　　　ABSTRACT

A method may include receiving monitoring data including a first monitoring event, a second monitoring event, and a third monitoring event associated with a computing system. The method may further include may determining, by a first predictive model, that the first and the second monitoring events are security-related while the third monitoring event is not security-related, a first feature set for the first monitoring event, and a second feature set for the second monitoring event. The method may further include determining, by a second predictive model, that the first and second feature sets relate to a first threat, and a third feature set that is associated with the first threat. The method may further include determining whether to perform an incident response action based on the third feature set.

18 Claims, 9 Drawing Sheets

(58) Field of Classification Search

CPC .... G06F 21/552; G06F 3/0652; G06F 21/566; G06N 20/00

See application file for complete search history.

(56) References Cited

U.S. PATENT DOCUMENTS

| | | |
|---|---|---|
| 10,164,995 B1 | 12/2018 | Fang et al. |
| 11,005,860 B1 | 5/2021 | Glyer et al. |
| 11,290,483 B1 | 3/2022 | Kannan et al. |
| 2016/0173509 A1 | 6/2016 | Ray et al. |
| 2017/0093902 A1* | 3/2017 | Roundy ................ G06F 21/554 |
| 2017/0118240 A1 | 4/2017 | Devi Reddy et al. |
| 2017/0308324 A1* | 10/2017 | Courville .............. G06F 3/0656 |
| 2017/0353476 A1 | 12/2017 | Gordon et al. |
| 2018/0219888 A1 | 8/2018 | Apostolopoulos |
| 2018/0343272 A1 | 11/2018 | Khalil et al. |
| 2019/0108470 A1* | 4/2019 | Jain ................ G06Q 10/063118 |
| 2019/0236610 A1 | 8/2019 | Sadaghiani et al. |
| 2020/0007560 A1* | 1/2020 | Niemela ............. H04L 63/1425 |
| 2020/0057953 A1* | 2/2020 | Livny .................... G06N 5/048 |
| 2020/0145442 A1 | 5/2020 | Jang et al. |
| 2020/0186544 A1* | 6/2020 | Dichiu .................. G06F 21/552 |
| 2020/0252422 A1 | 8/2020 | Davis et al. |
| 2020/0296124 A1* | 9/2020 | Pratt ........................ H04L 63/20 |
| 2020/0402295 A1* | 12/2020 | Lentz ...................... G06T 15/40 |
| 2021/0014250 A1 | 1/2021 | Walsh et al. |
| 2021/0097329 A1* | 4/2021 | Jia .......................... G06F 18/213 |
| 2021/0160260 A1 | 5/2021 | Hu et al. |
| 2021/0173937 A1 | 6/2021 | Vargas et al. |
| 2021/0203673 A1 | 7/2021 | Dos Santos et al. |
| 2021/0226994 A1 | 7/2021 | Wu et al. |
| 2022/0060497 A1 | 2/2022 | Crabtree et al. |
| 2022/0164440 A1 | 5/2022 | Murphy et al. |
| 2022/0198335 A1* | 6/2022 | Yoon ...................... G06N 20/00 |
| 2022/0201019 A1 | 6/2022 | Navarro |
| 2022/0263860 A1 | 8/2022 | Crabtree et al. |
| 2022/0329630 A1* | 10/2022 | Li .......................... G06F 21/577 |
| 2022/0368699 A1 | 11/2022 | Thomson |
| 2022/0385673 A1 | 12/2022 | Dong et al. |
| 2022/0400121 A1* | 12/2022 | Han .......................... G06N 5/04 |
| 2023/0105087 A1 | 4/2023 | Borges |
| 2023/0113375 A1* | 4/2023 | Thomas .............. H04L 63/1441 726/23 |
| 2023/0133892 A1 | 5/2023 | Kohout et al. |
| 2023/0135590 A1 | 5/2023 | Pearcy et al. |
| 2023/0153425 A1 | 5/2023 | Yuceer et al. |
| 2023/0156774 A1 | 5/2023 | Choi et al. |
| 2024/0119149 A1* | 4/2024 | Ezrielev ................. G06N 20/00 |
| 2024/0205256 A1* | 6/2024 | Tormasov ........... H04L 63/1425 |
| 2024/0356935 A1 | 10/2024 | Polak et al. |
| 2024/0356950 A1 | 10/2024 | Skarda et al. |
| 2024/0356957 A1 | 10/2024 | Bajer et al. |

FOREIGN PATENT DOCUMENTS

| | | | |
|---|---|---|---|
| CN | 115442279 | 12/2022 | |
| EP | 3751813 B1 * | 3/2023 | ......... H04L 63/1425 |
| IN | 202241007446 A * | 3/2022 | |
| WO | 2017083435 A1 | 5/2017 | |

OTHER PUBLICATIONS

George, D. A. S., George, A. H., Baskar, T., & Pandey, D. (2021). XDR: The Evolution of Endpoint Security Solutions-Superior Extensibility and Analytics to Satisfy the Organizational Needs of the Future. International Journal of Advanced Research in Science, Communication and Technology (IJARSCT), 8(1), 493-501.

International Search Report and Written Opinion for International Application No. PCT/US2024/024877, mailed Jun. 28, 2024, 14 Pages.

International Search Report and Written Opinion for International Application No. PCT/US2024/024923, mailed Jul. 1, 2024, 16 Pages.

International Search Report and Written Opinion for International Application No. PCT/US2024/026042, mailed Jun. 28, 2024, 17 Pages.

International Search Report and Written Opinion for International Application No. PCT/US2024/026055, mailed Jul. 23, 2024, 13 Pages.

Office Action for U.S. Appl. No. 18/455,491, Dated Oct. 7, 2025 21 pages.

* cited by examiner

500

SecurityEvent (
    id: unique object identifier
    eventTypeId: identifier of the Security Event type, listed in Security Event Catalog
    period: timeframe the observation of the event
    assetId: identifier of asset to which the Security Event belongs
    observables: typed set of observables, used for pivoting across independent security events
    attributes: remaining Event Detection Engine-specific attributes in the form of nested key-value schema
}

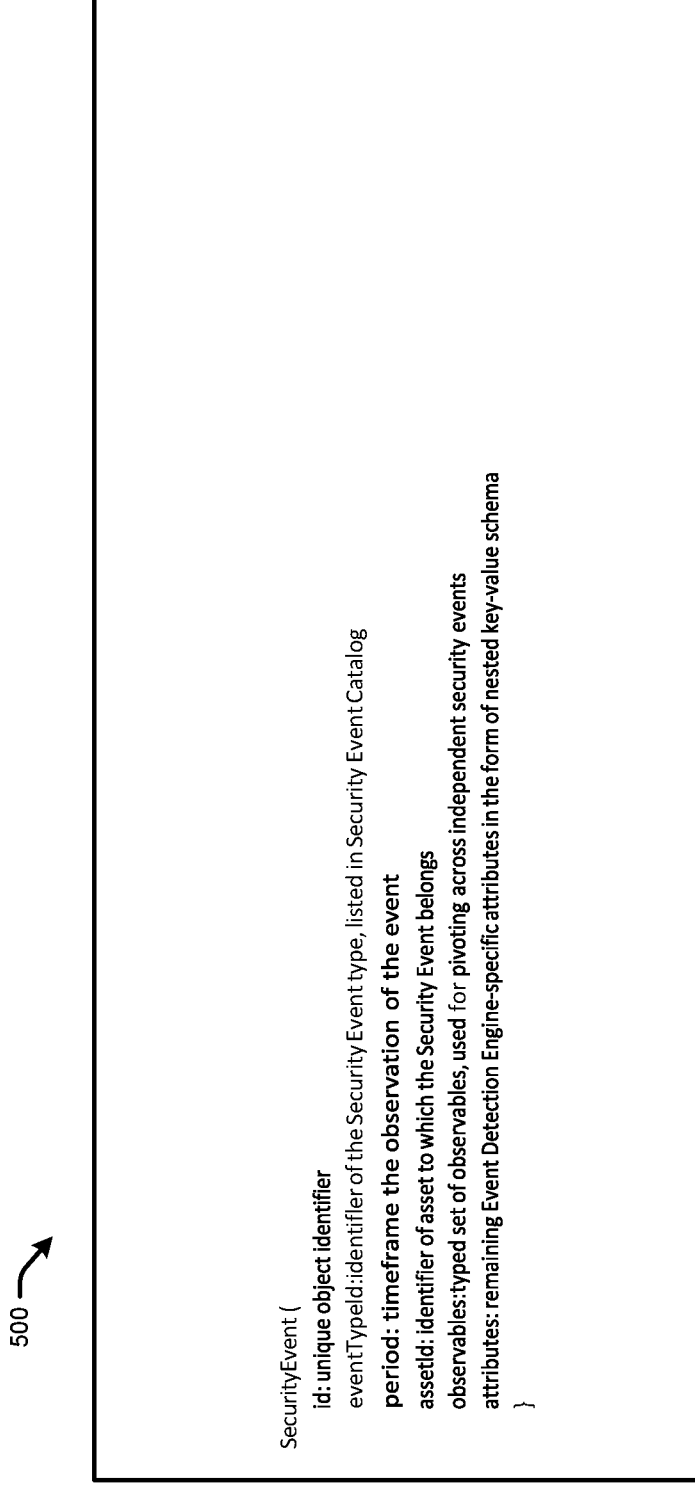

FIG. 5A

```
SecurityEventType {
    id: unique security event type
    title: short security event description
    description: detail security event description
    severity: severity of the detected event

}
```

510

520

ThreatDetection { id: unique object identifier threat

Typeid: unique identifier of threat type period: timeframe of he observation of the event assetId: identifier of asset to which the Threat Detection belongs convincingEvents: SecurityEvent -> optional[threatTypeId]: list of all security event objects related to the Threat detection

}

600

RECEIVE MONITORING EVENTS
602

DETERMINE EVENT FEATURE SETS FOR SECURITY-RELATED EVENTS
604

DETERMINE THREAT FEATURE SETS
606

DETERMINE ALERT FEATURE SETS
608

PERFORM INCIDENT RESPONSE OPERATIONS
610

COMPUTER
700

PREDICTIVE MODELS FOR EXTENDED DETECTION AND RESPONSE (XDR) SYSTEMS

CROSS-REFERENCES TO RELATED APPLICATION(S)

This present application claims priority to U.S. Provisional Patent Application No. 63/461,396, titled "Threat Detection in Extended Detection and Response (XDR) Systems," filed on Apr. 24, 2023, which is incorporated by reference herein in its entirety.

TECHNICAL FIELD

This present application pertains to the field of computer security and, more specifically, to extended detection and response (XDR) systems.

BACKGROUND

Extended detection and response (XDR) systems are an emerging technology for advanced threat detection and security incident response. XDR platforms integrate data from the entire information technology (IT) infrastructure of a computing system to provide unified visibility and automated actions against cyberattacks. However, effective threat detection and incident response in an XDR system requires effective and efficient processing of monitoring data from different security domains associated with different monitoring components, such as endpoint detection and response (EDR) systems, intrusion detection systems (IDSs), intrusion prevention systems (IPSs), firewalls, email security platforms, and the like.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5A depicts an event object template that defines the structure of an event object generated by an event model.

DESCRIPTION OF EXAMPLE EMBODIMENTS

Overview

Figure 1:
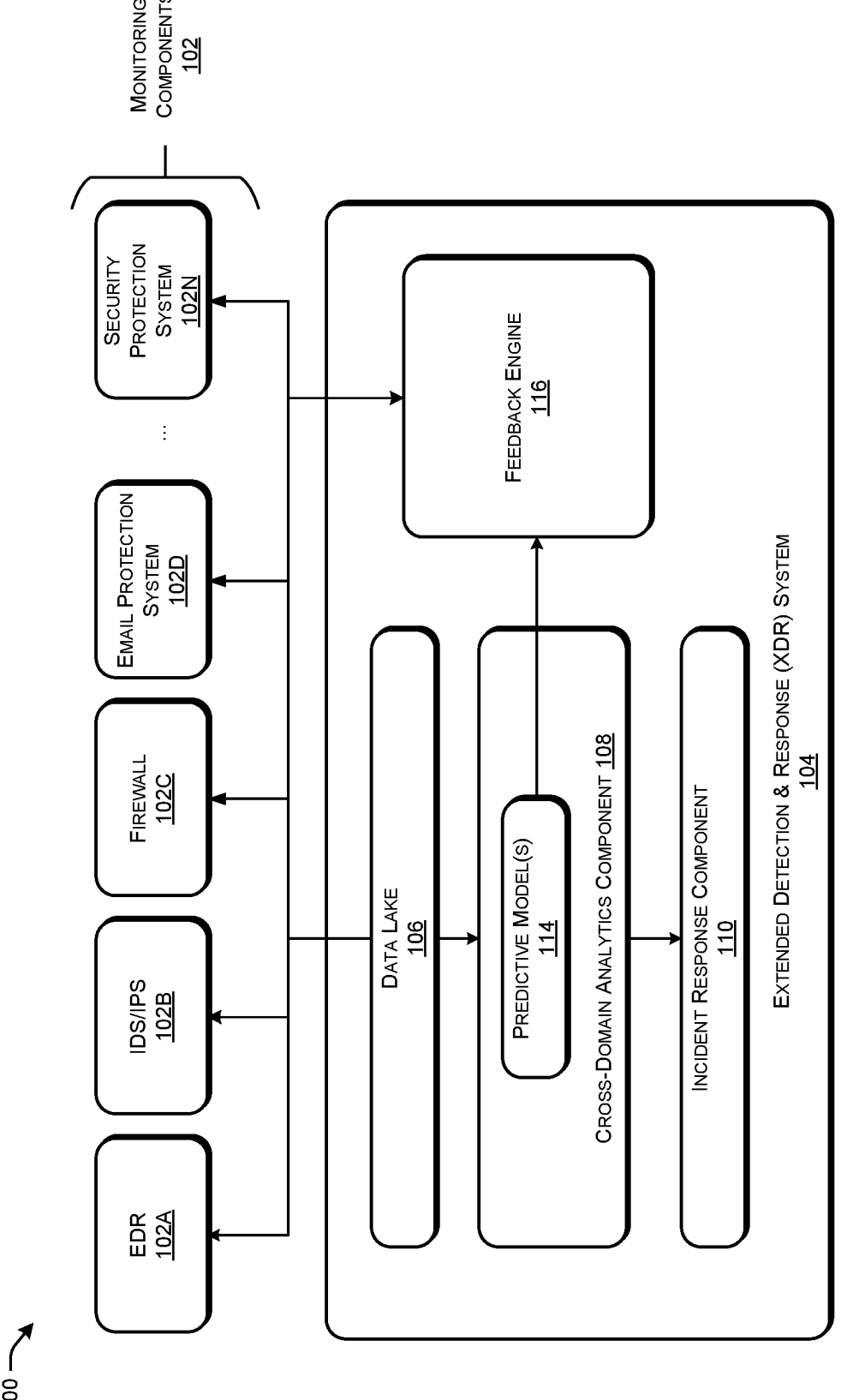
FIG. 1 depicts an example environment with an Extended Detection and Response (XDR) system that interacts with a set of monitoring components.

This disclosure described relate to techniques for monitoring heterogeneous domains in an Extended Detection and Response (XDR) system. In some cases, the techniques described herein relate to a method including receiving, by a processor, first monitoring data from a first monitoring component and second monitoring data from a second monitoring component. The method may further include determining, by the processor, that the first monitoring data represents a first activity pattern of a computing entity in a first period. The method may further include determining, by the processor, that the second monitoring data represents a second activity pattern of the computing entity in the first period. The method may further include determining, by the processor, first feedback data based on the first monitoring data. The method may further include determining, by the processor, second feedback data based on the second monitoring data. The method may further include providing, by the processor, the first feedback data to the second monitoring component. The method may further include providing, by the processor, the second feedback data to the first monitoring component.

In some cases, the techniques described herein relate to a method including receiving monitoring data comprising a first monitoring event, a second monitoring event, and a third monitoring event associated with a computing system. The method may further include providing the monitoring data to a first predictive model, wherein the first predictive model is configured to process the monitoring data to determine that the first monitoring event and the second monitoring event are security-related while the third monitoring event is not security-related, and a first feature set of the first monitoring event and a second feature set of the second monitoring event. The method may further include receiving, from the first predictive model, the first feature set and the second feature set. The method may further include providing the first feature set and the second feature set to a second predictive model, wherein the second predictive model is configured to process the first feature set and the second feature set to determine that the first feature set and the second feature set relate to a first threat, and a third feature set of the first threat. The method may further include receiving, from the second predictive model, the third feature set. The method may further include determining whether to perform an incident response action with respect to the computing system, wherein determining whether to perform the incident response action comprises providing the third feature set to a third predictive model.

Additionally, the techniques described herein may be performed by a system and/or device having non-transitory computer-readable media storing computer-executable instructions that, when executed by one or more processors, performs the method described above.

Example Embodiments

This disclosure described relate to techniques for monitoring heterogeneous domains in an Extended Detection and Response (XDR) system. In some cases, the techniques described herein relate to XDR system that interacts with various monitoring components such as an Endpoint Detection and response (EDR) system, an Intrusion Detection System (IDS)/Intrusion Prevention System (IPS), a firewall, an email protection system, and the like. The XDR system may include a data lake that receives and stores monitoring events from the monitoring components. A cross-domain analytics component performs analytics across events from different domains using predictive models to detect threats. An incident response component triggers automated or manual responses to incidents based on outputs of the analytics component.

In some cases, the XDR system includes one or more predictive models that process monitoring data (e.g., raw monitoring logs) generated by the monitoring components to detect security-related events, threats, alerts, and/or incidents. In some cases, the monitoring components generate events using local device identifiers. The XDR system's predictive models may include an event model that processes raw events to extract standardized features, a threat model that detects multi-stage attacks by correlating events, and an alert model that groups threats into alerts and assigns priorities. An incident model may also determine which alerts are incidents requiring response.

In some cases, the predictive models employ a multi-stage architecture to incrementally extract insights from monitoring events. For example, an event model may extract features from security-related events, while threat model may correlate events into threats and extracts threat features. An alert model groups threats into alerts with priorities. At each stage, intermediate objects may be discarded to minimize storage.

In some cases, the XDR system provides a feedback engine that shares insights on activity patterns and vulnerabilities with monitoring components to enhance their detection accuracy. In some cases, the feedback engine determines cross-component activity patterns and generates feedback data to improve anomaly detection. Providing such feedback data may facilitate collaborative monitoring between components.

In some cases, the techniques described herein improve detection accuracy of an XDR system. For example, the multi-stage architecture of the predictive models described herein improves detection of anomalous events. By correlating raw events into higher-level threat and alert objects, the multi-stage architecture generates latent threat patterns spanning multiple monitoring domains. These latent threat patterns provide a more comprehensive understanding of potential attacks and enable the XDR system to identify sophisticated threats that would have been challenging to detect using traditional methods.

As another example, the techniques described herein improve detection accuracy of an XDR system by providing feedback data to monitoring components. In some cases, by facilitating two-way sharing of activity pattern insights between the XDR system and monitoring components, the techniques described herein enable continuous mutual improvement of detection accuracy across heterogeneous systems. By bi-directionally sharing device, application, network, and vulnerability insights between the XDR system and monitoring components, the techniques described herein continuously enhance the detection accuracy across the monitoring components. This closed-loop approach may provide each monitoring component with the cross-domain visibility required for accurate system monitoring.

In some cases, the techniques described herein reduce the storage requirements of an XDR system by reducing the need to store raw monitoring data long term. For example, the multi-stage architecture of the predictive models described herein provides significant savings in data storage needs. Storing massive volumes of raw monitoring logs over extended periods of time requires substantial storage capacity. By only extracting key features from events and discarding granular event data after initial processing, storage demands are greatly reduced. For example, raw logs for a single endpoint may consume multiple gigabytes per day. But after extracting risk-relevant features like outbound connections to suspicious domains, the storage requirements for storing monitoring data are significantly reduced.

FIG. 1 depicts an environment 100 with an Extended Detection and Response (XDR) system 104 that interacts with a set of monitoring components 102, such as an EDR system 102A, an Intrusion Detection System (IDS)/Intrusion Prevention System (IPS) 102B, a firewall engine 102C, an email protection system 102D, and other security protection systems 102N.

The EDR system 102A may monitor activity on endpoints such as servers, desktops, and laptops. The EDR system 102A may generate monitoring events for suspicious or malicious activity observed on endpoints. The EDR system 102A may be implemented as agent software installed on each endpoint. The agent operates in the background, continuously collecting endpoint telemetry data and sending it to a central management console and/or the XDR system 104. The EDR agent may employ various techniques to detect threats, such as signature-based detection, behavioral analysis, and machine learning algorithms. Signature-based detection involves comparing observed activities against known patterns of malicious behavior or attack signatures. Behavioral analysis identifies anomalies or deviations from normal endpoint behavior which might indicate a potential threat. Machine learning algorithms may enhance detection capabilities by learning from historical data and adapting to new and emerging threats.

The IDS/IPS 102B may monitor network activity by analyzing network traffic. The IDS/IPS 102B may generate monitoring events for anomalous network traffic or known attack patterns. To achieve its monitoring and detection capabilities, the IDS/IPS 102B may use a combination of techniques, including machine learning techniques, signature-based detection, anomaly detection, and heuristic analysis. Signature-based detection involves comparing network traffic against a database of known attack signatures or patterns. Anomaly detection focuses on identifying deviations from normal network behavior, which may indicate possible intrusions or suspicious activities. Heuristic analysis involves applying predefined rules and behavioral models to detect unknown or emerging threats. In some cases, the IDS/IPS 102B performs at least one of an IDS or an IPS functionality. The IDS functionality may identify suspicious or anomalous network behaviors, such as port scans, unusual data transfer patterns, or unauthorized access attempts. The IPS functionality may take immediate action to block or prevent identified threats from progressing further into the network.

The IDS/IPS 102B may be implemented as a hardware or virtual network appliance deployed on the network. For example, the IDS/IPS 102B may be realized as a hardware appliance installed at strategic points within the network infrastructure. Alternatively, the IDS/IPS 102B may be deployed as a virtual network appliance running on virtualized servers or cloud-based instances.

The firewall engine 102C may filter incoming and outgoing network traffic according to configured rules. The firewall engine 102C may generate monitoring events when traffic is blocked or allowed. In some cases, the firewall engine 102C operates as a barrier between the internal network and the external world, controlling the flow of network traffic based on predefined rules. In some cases, the firewall engine 102C is configured to filter incoming and outgoing network traffic to enforce security policies and protect the organization's devices from unauthorized access, data exfiltration, and potential threats.

In some cases, when network packets arrive at the firewall, they are inspected against a set of configured rules and policies. These rules may be based on various criteria, such as source and destination IP addresses, port numbers, application protocols, or specific content within the packets. If a packet matches an allow rule, the firewall engine 102C permits it to pass through to its intended destination. On the other hand, if the packet matches a deny rule, the firewall engine blocks it, preventing unauthorized access or potentially malicious traffic from entering or leaving the network.

The firewall engine 102C may be implemented as a hardware or virtual network appliance. Hardware-based solutions may offer dedicated processing power for packet inspection, making them suitable for high-performance network environments where low latency is crucial. Virtual network appliances, running on virtualized servers or cloud instances, may provide flexibility and case of management, making them ideal for dynamic and rapidly changing network infrastructures.

The email protection system 102D may scan incoming and outgoing emails for malware and spam. The email protection system 102D may generate monitoring events for blocked or allowed emails. The email protection system 102D may be implemented as a software service integrated with email servers. In some cases, the email protection system 102D continually evaluates the content, attachments, and/or sender reputation of incoming emails. To do so, the email protection system 102D may use databases of known threat signatures to identify and block emails that exhibit malicious behavior or contain harmful content. In some cases, the email protection system 102D scrutinizes outgoing emails to ensure that they do not inadvertently transmit sensitive information or include suspicious links or attachments. In some cases, whenever the email protection system 102D identifies a potentially malicious or spam email, the email protection system 102D generates monitoring events to record the incident. These monitoring events may include details such as the sender's information, recipient details, timestamp, and/or a description of the threat or spam category.

Additional security protection systems 102N may enable other types of security monitoring and generate associated monitoring events. Examples of such additional security protection systems 102N include Web Application Firewalls (WAFs), Data Loss Prevention (DLP) systems, Network Access Control (NAC) systems, threat intelligence platforms, advanced threat detection systems, Security Information and Event Management (SIEM) systems, vulnerability management systems, and Endpoint Protection Platforms (EPPs). The additional security protection systems 102N may generate monitoring events that contribute to a comprehensive security posture to enable organizations to detect and respond to cyber threats. In some cases, integration of the additional security protection systems 102N with the XDR system 104 and other security components allows for centralized management, correlation of security data, and streamlined incident response efforts.

In some cases, each monitoring component 102 provides monitoring events that identify devices using a set of device identifiers that are local to that monitoring component. These "local device identifiers" may be distinct from the device identifiers used by other monitoring components. For example, the EDR system 102A may identify a device using an agent identifier (ID) assigned to the EDR agent software installed on that device, the username of the user logged into the device, the email address associated with the user account on the device, or other identifiers that are specific to the EDR system 102A. The IDS/IPS 102B may identify devices by their Internet Protocol (IP) address on the monitored network, Media Access Control (MAC) address, hostname, or other network-specific identifiers. The firewall engine 102C may identify devices by IP address, MAC address, or hostname if doing L2/L3 monitoring, or may identify devices by user if doing L7 application monitoring. The email protection system 102D may identify devices by the email address associated with the user account that is sending or receiving emails from that device.

The XDR system 104 may include a data lake 106 that receives and stores the monitoring events generated by the monitoring components 102. Data lake 106 may operate as a central hub for collecting, storing, and analyzing the monitoring events generated by the various monitoring components 102. Data lake 106 may receive the monitoring events retrospectively (e.g., asynchronously) and/or synchronously (e.g., in real-time) from the monitoring components 102, storing them in a structured or semi-structured format for efficient retrieval and analysis. Data lake 106 may be implemented using a database, data warehouse, and/or cloud storage. If implemented as a database, data lake 106 might utilize NoSQL databases like Apache Cassandra or MongoDB, providing horizontal scaling capabilities to handle large volumes of data. A data warehouse approach might use solutions like Amazon Redshift or Google Big-Query to enable complex analytics and reporting on historical data. Alternatively, cloud-based object storage services like Amazon S3 or Microsoft Azure Blob Storage might be utilized.

The XDR system 104 may also include a cross-domain analytics component 108 that retrieves monitoring events from the data lake 106 and performs cross-domain data analytics to detect security threats. The cross-domain analytics component 108 may utilize a set of predictive models 114 to perform cross-domain analysis on the monitoring events from the data lake 106. Predictive models 114 may include machine learning models that are trained to detect security threats across multiple monitoring domains, heuristic models, signature-based detection models, anomaly detection models, and/or the like.

For example, one predictive model may be trained to detect lateral movement across endpoints based on correlated sequences of events from the EDR system 102A, network connections from the IDS/IPS 102B, and user authentication events from the NAC system. This model may identify threat patterns like an adversary compromising one endpoint, then pivoting to gain access to additional endpoints across the network. Another predictive model may be trained to detect command-and-control communication by correlating may between the IDS/IPS 102B, firewall engine 102C, and DNS query events. This model may detect communication with known malicious infrastructure or anomalies in outbound connection patterns.

The predictive models 114 may incorporate a variety of machine learning algorithms, including neural networks, random forests, regression, and others. The predictive models 114 may be trained on historical monitoring events that have been labeled with known threat indicators. By learning complex relationships between events across monitoring domains, the predictive models 114 may detect new instances of malicious activity exhibited across multiple monitoring components 102. The cross-domain analytics component 108 may execute operations associated with the predictive models 114 in relation to real-time streams of monitoring events from the data lake 106. When the predictive models 114 detect a potential incident pattern with high priority, the cross-domain analytics component 108 may generate an indication for the incident response component 110 to address the incident pattern. This indication enables analysts to quickly identify priority threats requiring immediate response across the enterprise.

In some cases, the predictive models 114 include an event model that processes raw monitoring events to determine which events are security-related and generate a set of features for each security-related event. In some cases, the event model processes raw monitoring events from the various monitoring components 102. The event model may analyze each monitoring event to determine whether it is security-related based on rules, heuristics, and anomaly detection algorithms. For each security-related event, the event model extracts a set of features such as associated event type, associated timestamps, associated device(s), associated user identifiers, associated Internet Protocol (IP) addresses, and/or the like. In some cases, the event model outputs these security event feature sets for security-related events while discarding non-security related events.

In some cases, the event model includes a classification layer that determines whether an event is security related. In some cases, the classification layer is implemented using one or more machine learning classifiers to categorize event types. In some cases, the classification layer is implemented using one or more detection algorithms to identify unusual events deviating from baseline behavior. In some cases, the classification layer is implemented using one or more heuristics encoded to specify known anomalous patterns. In some cases, the event model includes a feature extraction layer that extracts feature(s) for each security-related event.

In some cases, the predictive models 114 include a threat model that processes the feature sets for the security-related events (e.g., as generated by the event model) to detect correlated groups of security-related events known as threats. In some cases, the threat model correlates related events across time and devices to identify multi-stage attacks and threat campaigns. The threat model may generate threat objects representing these detected threats. The threat model may additionally generate a set of features for each detected threat. Examples of features for a threat include: (i) one or more timestamps associated with the threat, (ii) identifiers for the correlated events used to generate the threat, (iii) feature sets of correlated events used to generate the threat, and (iv) device(s) targeted by the threat.

In some cases, the threat model may utilize graph algorithms and/or statistical models to detect a connected sequence of events related to a common set of devices, where the sequence matches known adversarial tactics. In some cases, the threat model may utilize machine learning classifiers to identify events associated with specific threat types. In some cases, the threat model processes events across heterogeneous monitoring components 102 to uncover attacks spanning multiple monitoring domains.

In some cases, the predictive models 114 include an alert model that processes the feature sets for the detected threats (e.g., as generated by the threat model) to: (i) detect correlated groups of detected threats known as alerts, and/or (ii) for each alert, generate a priority score. In some cases, the alert model groups related threats into alert objects based on threat features generated by the threat model. The alert model may additionally compute priority scores for each alert based on factors like system-wide significance of affected devices, known system vulnerabilities, and estimated business impacts. In some cases, high priority alerts are escalated for immediate investigation.

In some cases, the alert model includes a clustering layer that groups similar threats. The clustering layer may include unsupervised learning algorithms. In some cases, the alert model may include a priority layer that generates priority scores for alerts. The priority layer may use regression models. In some cases, the priority scores generated by the alert model enable automated triage to focus analyst efforts on the most critical threats. The alert model may generate a set of features for each detected alert.

In some cases, the predictive models 114 include an incident model that determines (e.g., based on alert features generated by the alert model) whether each alert is an incident as determined based on predefined incident definition criteria. In some cases, the incident model determines whether an alert is an incident based on whether one or more alert features match predefined incident criteria set (e.g., as defined by security policies and/or regulations). In some cases, if the incident model determines that an alert is an incident, the incident response component 110 initiates incident response operations.

The XDR system 104 may also include an incident response component 110 that initiates automated or manual responses to security incidents detected by the cross-domain analytics component 108. Responses may include isolating affected endpoints, blocking IP addresses, or notifying security teams. The incident response component 110 may integrate with security workflows. To streamline and optimize incident response efforts, incident response component 110 may integrate with the Security Information and Event Management (SIEM) systems, ticketing systems, or other incident response platforms.

In some cases, when the cross-domain analytics component 108 identifies a security incident, the incident response component 110 is triggered to initiate appropriate responses. These responses may be automated, where predefined response actions are executed based on predefined playbooks and policies, or manual, where security analysts are involved in making informed decisions on response actions based on the severity and nature of the incident. Automated responses may involve isolating affected endpoints or devices from the network to prevent lateral movement of threats and contain the spread of malware. The incident response component 110 may use network access control (NAC) systems or firewall rules to implement these isolation measures. Furthermore, the incident response component 110 may take automated actions to block or blacklist malicious IP addresses or domains associated with the detected threats. In the case of sophisticated threats that require a deeper investigation or involve critical devices, the incident response component 110 may trigger manual responses. Security analysts may investigate the incident further, gather additional context, and collaborate to devise and execute appropriate remediation actions. Additionally, the incident response component 110 may alert security teams and relevant stakeholders when a security incident is detected. These notifications may be in the form of email alerts, ticketing system integrations, or other communication channels to ensure timely attention and action.

In some cases, the XDR system includes a feedback engine 116 that provides feedback data to monitoring components 102 based on activity patterns (e.g., device activity patterns, network activity patterns, etc.) detected based on monitoring data received from the monitoring components 102 and/or based on the output of the predictive models 114. The feedback engine 116 may determine activity patterns exhibited by devices or users based on correlated monitoring data from multiple monitoring components 102. For example, network activity patterns from the IDS/IPS 102B may be combined with endpoint activity from the EDR system 102A to identify broader behavioral profiles. The feedback engine may correlate monitoring events based on determining that those events occur within the same period and/or relate to the same computing device.

In some cases, the feedback engine 116 generates feedback data representing these cross-component activity patterns and provides the feedback data back to the individual monitoring components 102. This feedback data may operate as shared data to enhance the detection capabilities of monitoring components 102. For example, the feedback data may indicate expected operating systems, applications, roles, and network behaviors for different groups of devices. The EDR system 102A may leverage such feedback data to fine-tune its anomaly detection models and reduce false positives. Meanwhile, the IDS/IPS 102B may use the feedback data to whitelist expected traffic patterns and focus on detecting actual anomalies.

In some cases, the feedback engine 116 generates feedback data representing identified vulnerabilities tied to specific device configurations. Such feedback data may enable the firewall engine 102C to implement micro-segmentation and additional monitoring for at-risk systems.

In some cases, the feedback engine 116 may generate feedback data identifying operating systems, server roles, and device classifications from the EDR system's continuous monitoring of endpoint configurations. The IDS/IPS may then use this feedback data to build whitelists of expected traffic based on server functions and tune anomaly detection based on peer groups of devices with similar roles. In some cases, the feedback engine 116 may generate feedback data identifying installed applications and associated vulnerabilities by aggregating software inventory scans from the EDR system. The firewall engine may use such feedback data to implement additional safeguards around outdated and/or vulnerable software. In some cases, the feedback engine 116 may generate feedback data representing prevalence and trust levels of internal and external IP addresses (e.g., based on monitoring logs from IDS/IPS). The EDR system may use such feedback data to enhance risk scoring and prioritization of threats targeting anomalous IPs. In some cases, the feedback engine 116 may generate feedback data representing the probability of connections to different geographic regions and autonomous systems by mining firewall traffic logs. The IDS/IPS may use this data to detect abnormal spikes in traffic to high-risk regions.

In some cases, by facilitating two-way sharing of activity pattern insights between the XDR system and underlying monitoring components 102, the feedback engine 116 enables continuous mutual improvement of detection accuracy across heterogeneous systems. By bi-directionally sharing device, application, network, and vulnerability insights between the XDR system and monitoring components, the feedback engine 116 continuously enhances the detection accuracy across the monitoring components. This closed-loop approach may provide each monitoring component with the cross-domain visibility required for accurate system monitoring.

Accordingly, in some cases, the feedback engine 116 enables collaborative monitoring between different monitoring components. One monitoring component may provide feedback data to another component to improve detection capabilities. In some cases, feedback data includes correlation data that links identifiers for an entity from different monitoring components. For example, one monitoring component may determine the operating system used by an entity while another component determines the geographic location. The feedback data may correlate the operating system with the location to improve monitoring. This allows the components to leverage insights from each other to build more complete profiles. In some cases, feedback data includes adjustments to detection thresholds used by monitoring components. A monitoring component may increase or decrease detection thresholds based on insights about expected behavior. For example, if an entity is found to be part of a trusted group, the threshold may be raised to reduce false alarms. Such feedback enables tuning detection to balance security and usability. In some cases, a monitoring component may provide monitoring data to another component to retrain or update its predictive models. This approach allows the predictive models to incorporate diverse data sources and improve over time. More accurate models strengthen monitoring and detection capabilities.

Figure 2:
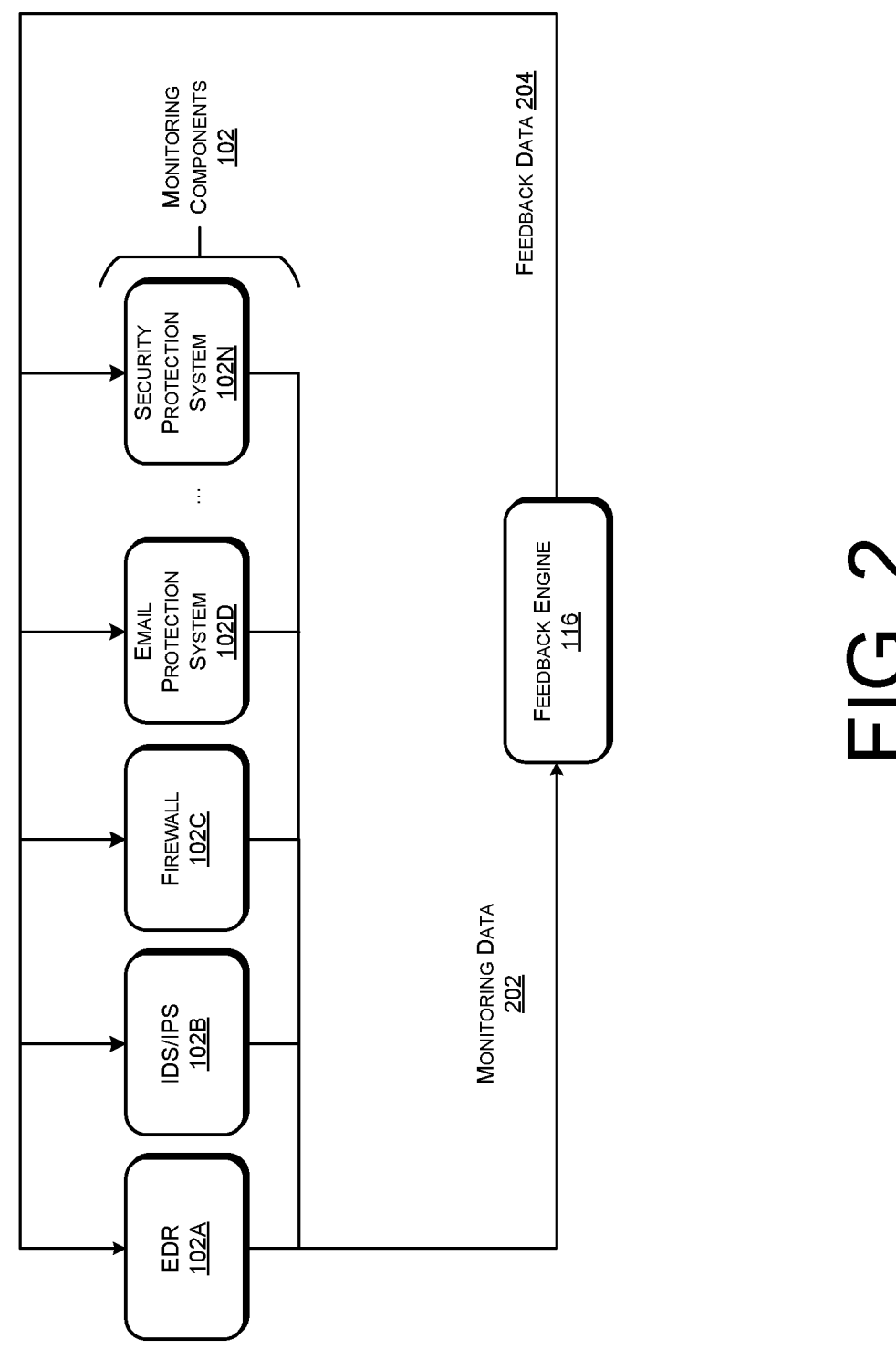
FIG. 2 is a data flow diagram of an example process for providing feedback data to monitoring components.

FIG. 2 is a data flow diagram of an example process 200 for providing feedback data 204 to monitoring components 102. As depicted in FIG. 2, the monitoring components 102 provide monitoring data 202 (e.g., via the data lake 106) to the feedback engine 116, which processes the monitoring data 202 to determine feedback data 204 and provide the feedback data 204 to the monitoring components.

In some cases, the feedback engine 116 correlates related events in this monitoring data 202 to identify broader activity patterns. For example, the feedback engine 116 may detect that connections from a particular subnet frequently target a specific external domain on a particular TCP port during business hours. By aggregating evidence across network, endpoint, and authentication event logs, the feedback engine 116 may uncover latent patterns not visible to any single monitoring component 102.

In some cases, feedback engine 116 compiles activity patterns (e.g., identified vulnerabilities, grouped devices, protocol analyses, and/or the like) into feedback data 204. This feedback data 204 may then be provided to monitoring components 102. Each monitoring component 102 may store feedback data 204 in a local database. The monitoring component 102 may reference this database when processing new events to incorporate the shared cross-domain insights. For example, the IDS/IPS 102B may initially flag an anomalous connection based on the rarity of the destination IP. However, subsequently, the IDS/IPS 102B may remove the flag by querying the feedback database to detect that the IP is tied to a whitelisted business partner.

Figure 3:
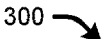
FIG. 3 is a flowchart diagram of an example process for coordinating cross-component feedback between a set of monitoring components.
Figure 3:
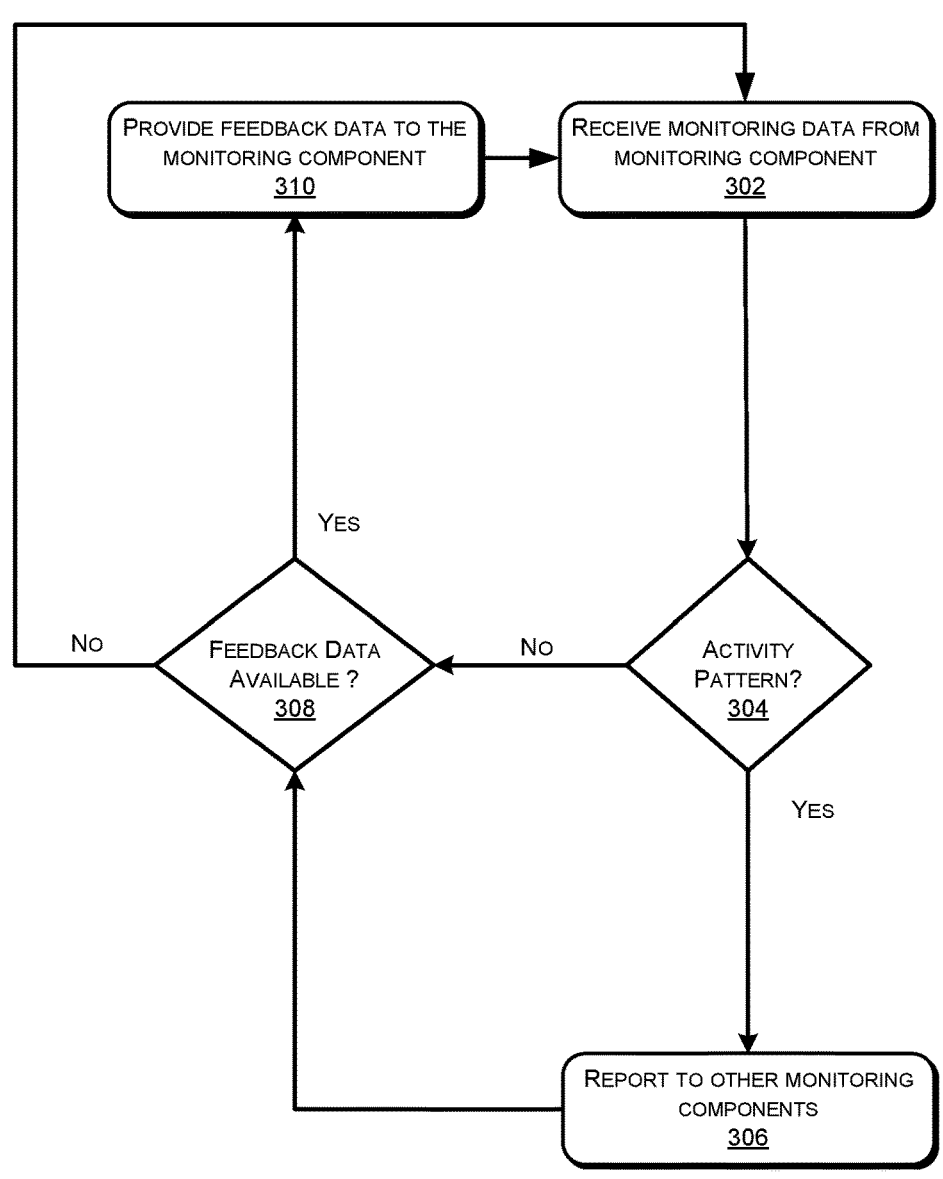

FIG. 3 is a flowchart diagram of an example process 300 for coordinating cross-component feedback between a set of monitoring components. At operation 302, process 300 includes receiving monitoring data from a monitoring component. The monitoring data may include at least one of: (i) raw monitoring logs, or (ii) events generated by detecting correlations across the raw monitoring logs.

At operation 304, process 300 includes determining whether the monitoring data indicates at least one activity pattern. In some cases, monitoring data is processed (e.g., using a predictive model) to determine whether the monitoring data indicates at least one activity pattern. In some cases, monitoring data is processed along with monitoring data received from one or more other monitoring components (e.g., using a predictive model) to determine whether the combined monitoring data indicates at least one activity pattern.

In some cases, the monitoring component monitors one or more network conditions of a network associated with a computing entity. In some cases, when the monitoring component monitors one or more network conditions of a network associated with the computing entity, the inferred activity pattern represents at least one of: (i) a measure of frequency of connections between the computing entity and network nodes external to the network, (ii) a measure of frequency of connections between the computing entity and a geographic system, or (iii) a measure of frequency of connections between the computing entity and an anomalous system.

In some cases, the monitoring component monitors software configurations of a software application executed by the computing entity. In some cases, when the monitoring component monitors software configurations of a software application executed by the computing entity, the inferred activity pattern represents at least one of: (i) a type of the software application, (ii) an operating system type associated with the computing entity, (iii) a system call made by the software application during the first period, (iv) a role performed by the computing entity within a network associated with the computing entity, or (v) a vulnerability of the software application.

In some cases, monitoring data represents that a computing entity uses a first operating system during the first period. In some cases, the monitoring data is combined with second monitoring data representing the computing entity connects from a first geographic location during the first period to determine an activity pattern that represents that, when connecting from the first geographic location, the computing entity uses the first operating system.

If the monitoring data detects at least one activity pattern (Yes branch of operation 304), then (at operation 306) the process 300 includes reporting the detected activity pattern to other monitoring components as part of feedback data provided to those components. In some cases, the feedback data provided to each monitoring component includes an aggregation of detected activity patterns determined based on monitoring data of other monitoring components. In some cases, the feedback data provided to each monitoring component includes an aggregation of detected activity patterns determined based on monitoring data of other monitoring components, where the monitoring data is received after a time associated with latest feedback.

At operation 308, process 300 includes determining whether feedback is available for the monitoring component whose monitoring data was received at operation 302. If such feedback data is available (Yes branch of operation 308), then the feedback data is provided to the target monitoring component at operation 310. In some cases, the monitoring component is configured to monitor a computing entity based on whether an observed activity pattern associated with the computing entity deviates from activity pattern(s) described by the received feedback data. For example, the monitoring component may be configured to whitelist activity by the computing entity that matches the activity pattern(s). As another example, the monitoring component may be configured to adjust a detection threshold based on the activity pattern(s). The detection threshold may be a value that defines when monitoring data associated with a computing entity are determined to indicate anomalous activity. In some cases, adjusting the first detection threshold comprises increasing the first detection threshold based on a determination that the computing entity belongs to a safe group of computing entities.

Figure 4:
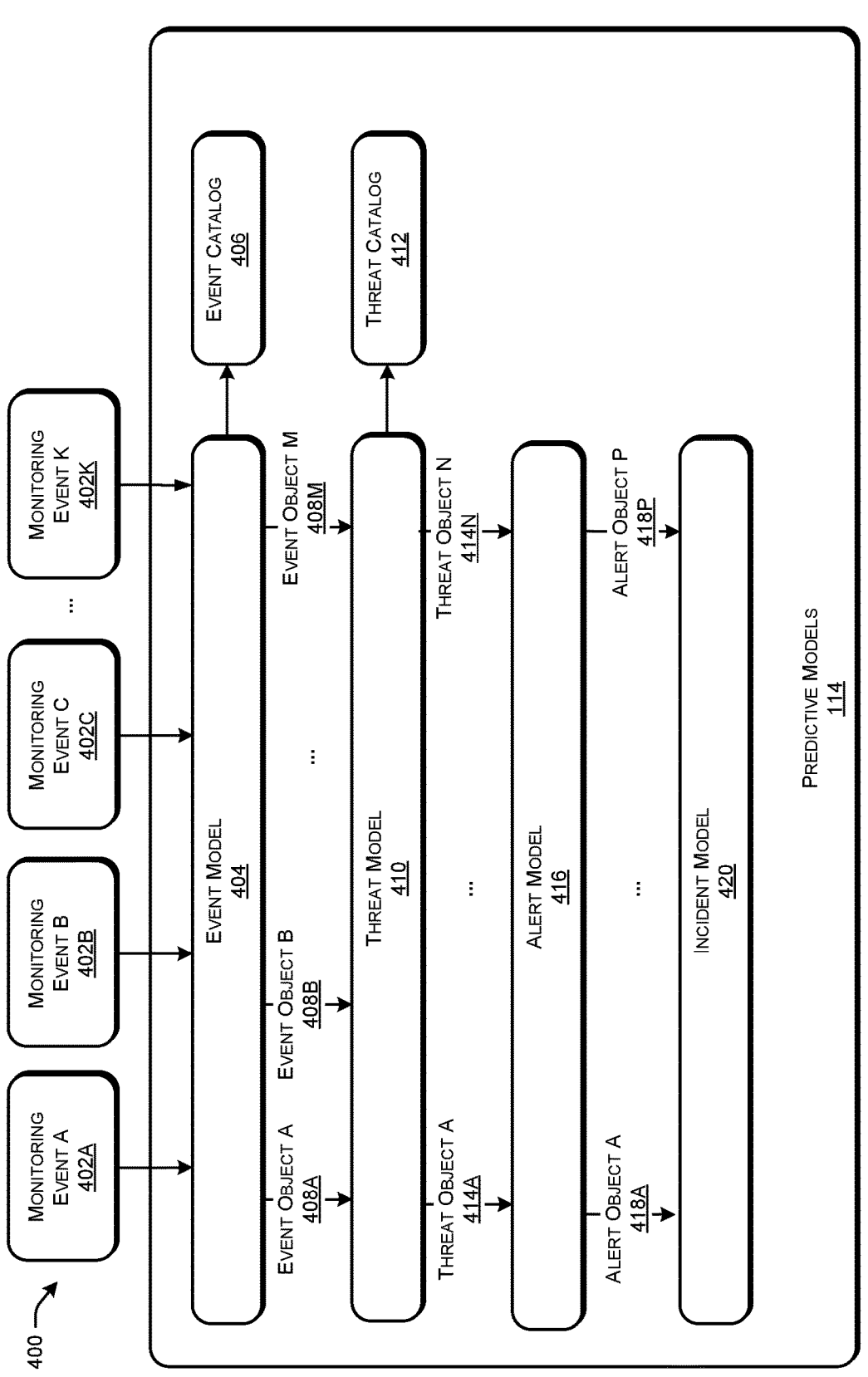
FIG. 4 provides an example architecture for a set of predictive models.

FIG. 4 provides an example architecture 400 for a set of predictive models 114. As depicted in FIG. 4, according to the architecture 400, an event model 404 is configured to process a set of K monitoring events (e.g., a set of K monitoring logs) including monitoring event A 402A, monitoring event B 402B, monitoring event C 402C, and monitoring event K 402K. The event model 404 is configured to determine a set of M event objects, including event object A 408A, event object B 408B, and event object M 408M. Each event object may represent a set of features associated with a monitoring event that is determined to be security related. In some cases, the event model 404 is configured to determine a security-related subset of the K monitoring events and determine, for each security-related event, an event object that represents a feature set associated with the monitoring event. In some cases, after the event model 404 processes the K monitoring events, the K monitoring events are removed from a storage medium (e.g., a data lake) associated with the XDR system. This removal eliminates the need for long-term storage of raw monitoring data after useful features have been extracted.

In some cases, the event objects generated by the event model 404 have a predefined format corresponding to an event object template, such as the event object template 500 that is depicted in FIG. 5A. In some cases, the event model 404 determines an event type for each event that the event model 404 processes. In some cases, the event catalog 406 stores features associated with each event type. In some cases, a storage medium stores at least one of the following: (i) an indication of which of the K monitoring events are security related, or (ii) the M event objects containing feature sets for M security-related events.

The architecture 400 also includes a threat model 410 configured to process the M event objects (e.g., as retrieved from the event catalog 406). The threat model 410 be configured to determine N threat objects, including threat object A 414A and threat object N 414N. Each threat object represents features associated with one of N detected threats, where each detected threat is a group of the M security-related events. The feature set associated with a detected threat may describe a set of one or more related event objects associated with the detected threat. In some cases, a threat object may correspond to multiple event objects representing stages of an attack campaign on a particular asset. After generating the threat objects, the threat model 410 may remove the intermediate event objects from a storage medium that stores such objects, further minimizing resource requirements. In some cases, the threat model 410 stores the N threat objects in a storage medium. In some cases, each of the N threat objects has a format that corresponds to a threat object template, such as the threat object template 520 of FIG. 5B. In some cases, the threat model 410 generates a threat for each detected threat type. In some cases, the threat catalog 412 stores features associated with each threat type.

The architecture 400 also includes an alert model 416 that processes the N threat objects to determine P alert objects, such as alert object A 418A and alert object P 418P. Each alert object may correspond to a grouping of the N detected threats and includes features of the grouping, such as a listing of the detected threats in the grouping. In some cases, after generating the P alert objects, the alert model 416 removes the N threat objects from a storage medium to further reduce storage requirements. In some cases, each of the P alert objects has a format that corresponds to an alert object template. In some cases, the alert model 416 generates a priority score for each alert object.

The architecture 400 also includes an incident model 420 that processes the P alert objects (e.g., and their respective priority scores) to determine which of those P alert objects corresponds to incidents. The incident model 420 may also be configured to recommend an incident response action for each alert object that is determined to be an incident.

FIG. 5A depicts an event object template 500 that defines the structure of an event object generated by an event model. As depicted in FIG. 5A, the event object template 500 contains an id field that uniquely identifies the event object. The eventTypeId field identifies the type of the event by referencing an event type object. The period field identifies the timeframe during which the event occurred. The assetId field identifies the monitored asset (e.g., computing device, virtual machine, user, and/or the like) associated with the event. The observables field identifies a set of entities like IP addresses that relate to the event. Finally, the attributes field identifies any additional data captured from the source monitoring component that may be indicated using key-value pairs and/or JavaScript Object Notation (JSON) objects.

Figure 5B:
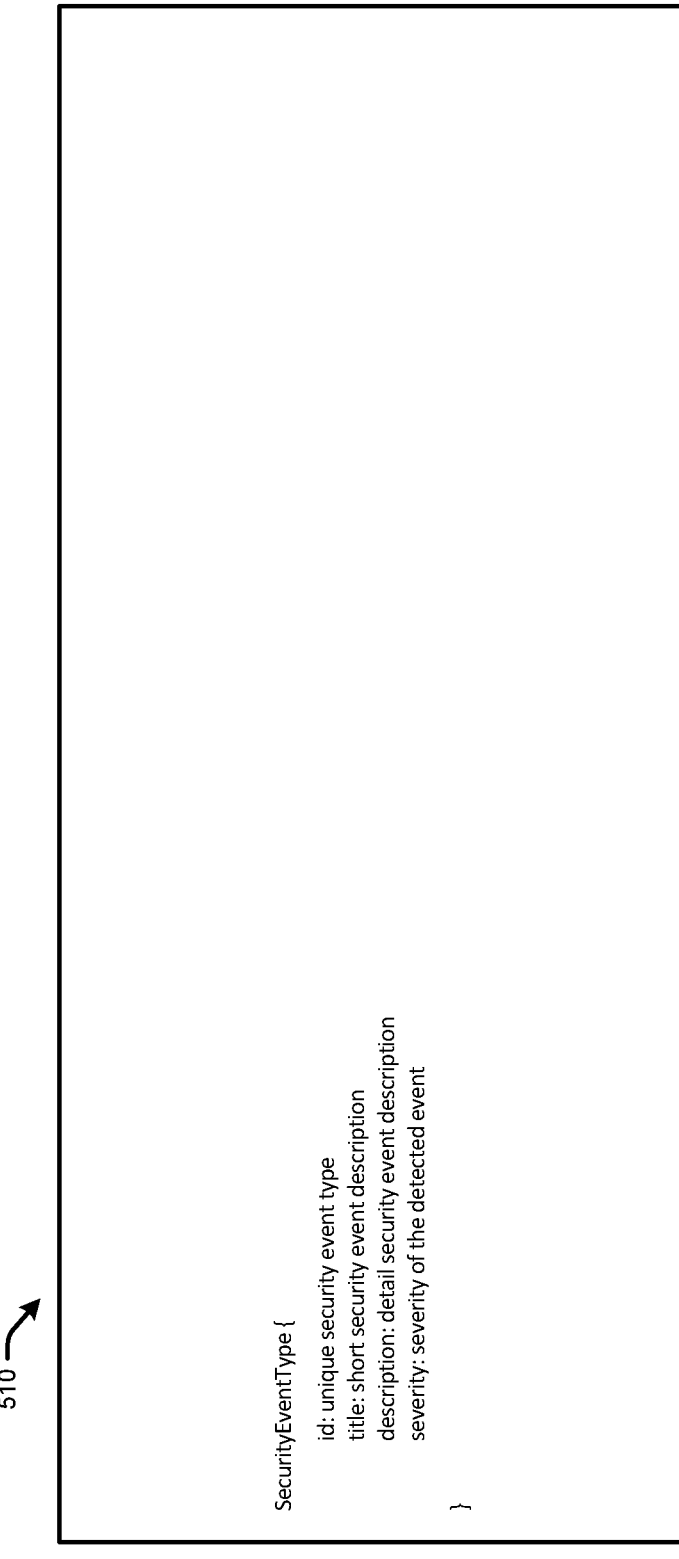
FIG. 5B depicts an event type object template that defines the properties of a monitoring event type.

FIG. 5B depicts an event type object template 510 that defines the properties of a monitoring event type. As depicted in FIG. 5B, the event type object template 510 contains an id field that uniquely identifies the monitoring event type. The title and description fields provide high-level and detailed textual information about the event type. The severity field identifies a severity level like low, medium, or critical for the event type.

Figure 5C:
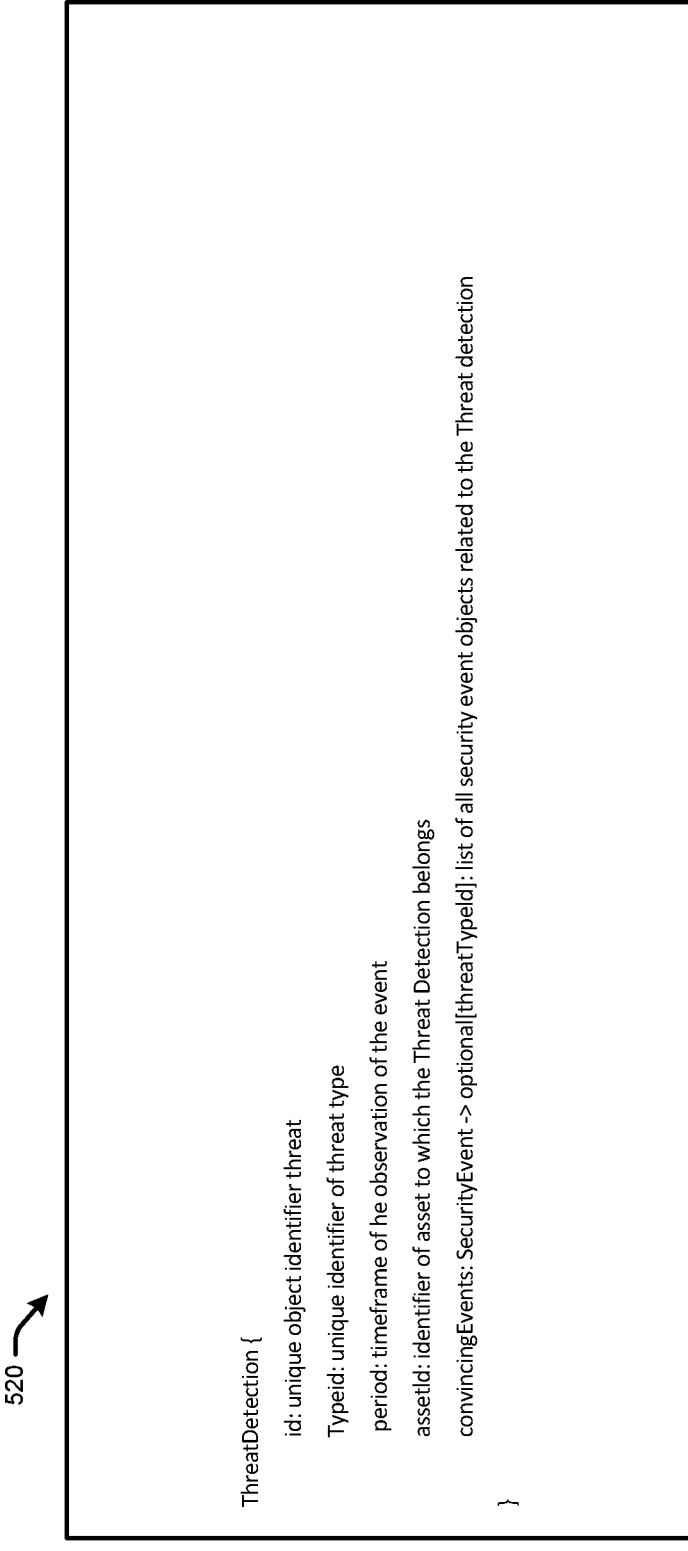
FIG. 5C depicts a threat object template that defines the structures of a threat object generated by a threat model.

FIG. 5C depicts a threat object template 520 that defines the structures of a threat object generated by a threat model. As depicted in FIG. 5C, the threat object template 520 contains an id field that uniquely identifies a detected threat. The threatTypeId field identifies a type of threat. The period field identifies the timeframe during which the threat was detected. The assetId field identifies the asset associated with the threat. The convincingEvents field identifies the event objects that provided evidence for identifying the threat.

Figure 6:
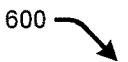
FIG. 6 is a flowchart diagram of an example process performing incident response operations based on a set of monitoring events.
Figure 6:
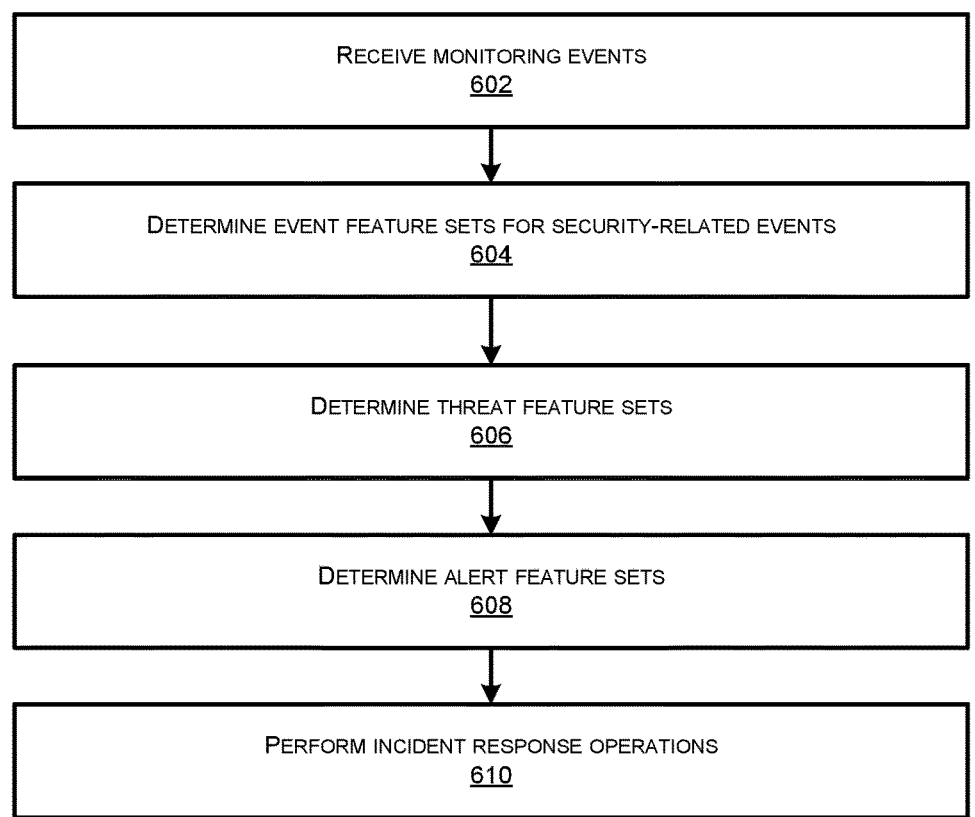

FIG. 6 is a flowchart diagram of an example process 600 for performing incident response operations based on a set of monitoring events. At operation 602, process 600 includes receiving the set of monitoring events. The set of monitoring events may include a set of monitoring logs. In some cases, operation 602 includes receiving a set of heterogeneous monitoring events from the various security monitoring components. The monitoring events may originate from diverse sources like firewall logs, endpoint detections, vulnerability scans, intrusion protection systems, and more.

At operation 604, process 600 includes determining event feature sets for those events that are determined to be security related. In some cases, operation 604 includes analyzing each monitoring event using techniques like heuristics, statistical analysis, and machine learning to determine if the event is security related. For qualifying events, standardized features may be extracted to enable further correlation while discarding non-essential data.

At operation 606, process 600 includes determining threats by grouping events and determining threat feature sets for those threats. In some cases, operation 606 includes aggregating related security events into threat objects representing detected attacks, breaches, and/or violates. For each threat, a feature set may be generated to summarize the nature of the threat and its associated observables.

At operation 608, process 600 includes determining alerts by grouping threats and determining alert feature sets for those alerts. In some cases, operation 608 includes clustering threats into alert objects based on similarity of devices, systems, vulnerabilities, and/or users. In some cases, operation 608 includes determining a priority score for each generated alert.

At operation 610, process 600 includes performing incident response operations based on a subset of alerts that are determined to satisfy incident definition criteria. In some cases, operation 610 includes evaluating alerts against predefined incident criteria to identify qualifying events that may require formal tracking and reporting. Incidents may require notification of management, customers, or government authorities. Incident response procedures may be initiated for threats meeting the configured incident definitions.

Figure 7:
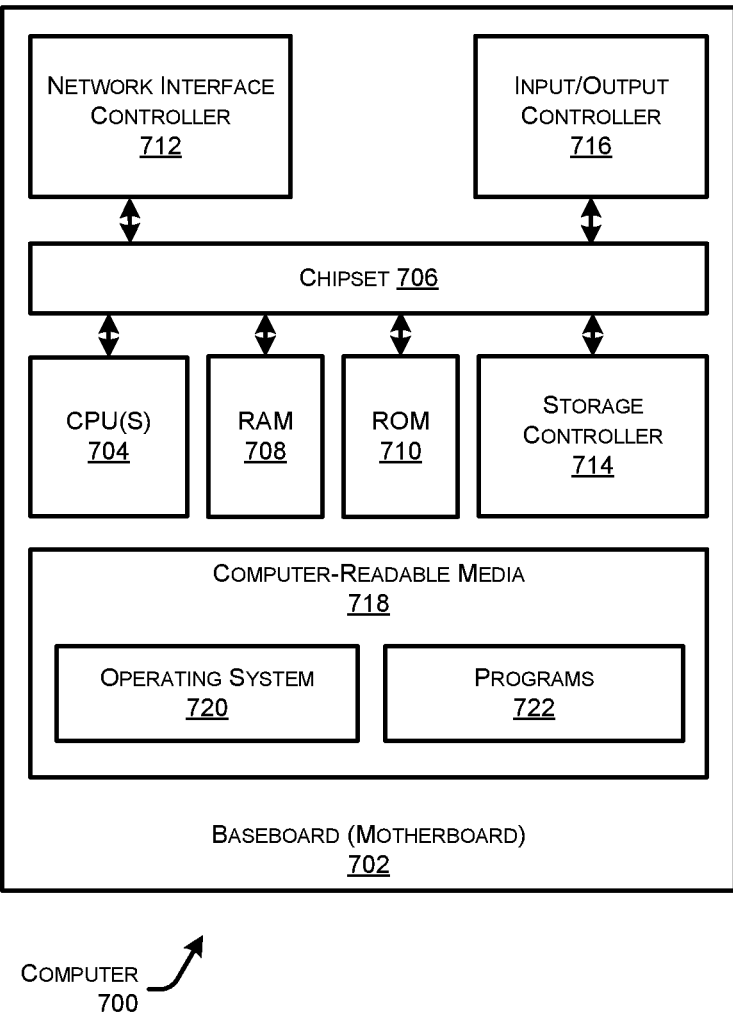
FIG. 7 shows an example computer architecture for a computing device (or network routing device) capable of executing program components for implementing the functionality described above.

FIG. 7 shows an example computer architecture for a computing device (or network routing device) 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computing device 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network. The chipset 706 can include functionality for providing network connectivity through a NIC 712, such as a gigabit Ethernet adapter. The NIC 712 is capable of connecting the computing device 700 to other computing devices over the network. It should be appreciated that multiple NICs 712 can be present in the computing device 700, connecting the computer to other types of networks and remote computer systems.

The computing device 700 can be connected to a storage device 718 that provides non-volatile storage for the computing device 700. The storage device 718 can store an operating system 720, programs 722, and data, which have been described in greater detail herein. The storage device 718 can be connected to the computing device 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the storage device 718 by detecting the physical states or characteristics of one or more particular locations within the physical storage units.

In addition to the mass storage device 718 described above, the computing device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 700. In some examples, the operations performed by a network, and/or any components included therein (e.g., a router, such as an edge router), may be supported by one or more devices similar to computing device 700. Stated otherwise, some or all of the operations performed by the network, and or any components included therein, may be performed by one or more computing device 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD- ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computing device 700.

In one embodiment, the storage device 718 or other computer-readable storage media is encoded with computer-executable instructions which, when loaded into the computing device 700, transform the computer from a general-purpose computing system into a special-purpose computer capable of implementing the embodiments described herein. These computer-executable instructions transform the computing device 700 by specifying how the CPUs 704 transition between states, as described above. According to one embodiment, the computing device 700 has access to computer-readable storage media storing computer-executable instructions which, when executed by the computing device 700, perform the various processes described above with regard to FIGS. 1-6. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

The computing device 700 may support a virtualization layer, such as one or more components associated with a computing resource network. The virtualization layer may provide virtual machines or containers that abstract the underlying hardware resources and enable multiple operating systems or applications to run simultaneously on the same physical machine. The virtualization layer may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 700 may also support other software layers, such as middleware, application frameworks, or databases, that provide additional abstraction and services to application developers and users. In some cases, the computing device 700 may provide a flexible and scalable platform for hosting diverse workloads and applications, from simple web services to complex data analytics and machine learning tasks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, by a processor, monitoring data, wherein:

the monitoring data comprises a first monitoring event, a second monitoring event, and a third monitoring event associated with a computing system, the first monitoring event is received from a first monitoring system, the second monitoring event is received from a second monitoring system, and the third monitoring event is received from a third monitoring system, at least one of the first monitoring system, the second monitoring system, or the third monitoring system comprises a component selected from a group consisting of an endpoint detection and response system, an intrusion detection and response system, an intrusion prevention system, a firewall, and an email security system, and the monitoring data is stored on a storage medium associated with the computing system;

providing, by the processor, the monitoring data to a first predictive model, wherein the first predictive model is configured to process the monitoring data to determine:

that the first monitoring event and the second monitoring event are security-related while the third monitoring event is not security-related, and a first feature set that is associated with the first monitoring event and a second feature set that is associated with the second monitoring event;

receiving, by the processor and from the first predictive model, the first feature set and the second feature set;

subsequent to processing the monitoring data by the first predictive model and determination of the first feature set and the second feature set by the first predictive model based on processing of the monitoring data, storing, by the processor, the first feature set and the second feature set on the storage medium, and removing, by the processor, the monitoring data from the storage medium;

providing, by the processor, the first feature set and the second feature set to a second predictive model, wherein the second predictive model is configured to process the first feature set and the second feature set to determine:

that the first feature set and the second feature set relate to a first threat, and a third feature set that is associated with the first threat;

receiving, by the processor and from the second predictive model, the third feature set;

subsequent to processing the first feature set and the second feature set by the second predictive model and determination of the third feature set by the second predictive model based on processing of the first feature set and the second feature set, and prior to processing of the third feature set by a third predictive model, storing, by the processor, the third feature set on the storage medium, and removing, by the processor and by the second predictive model, the first feature set and the second feature set from the storage medium;

determining, by the processor and based on the third feature set, an automated remedial action associated with the computing system; and executing, by the processor, the automated remedial action.

2. The method of claim 1, wherein:

the third predictive model is configured to process the third feature set and a fourth feature set that is associated with a second threat to determine a fifth feature set associated with a first alert;

the first alert is associated with the first threat and a second threat;

the second threat is associated with a fourth monitoring event and a fifth monitoring event of the computing system; and the method further comprises:

receiving, by the processor and from the third predictive model, the fifth feature set; and providing, by the processor, the fifth feature set to a fourth predictive model.

3. The method of claim 2, wherein the fourth predictive model is configured to determine the automated remedial action based on the fifth feature set.

4. The method of claim 2, wherein:

the first feature set and the second feature set are associated with a first template; and the third feature set and the fourth feature set are associated with a second template that is different from the first template.

5. The method of claim 1, wherein the third feature set comprises a first identifier of the first monitoring event and a second identifier of the second monitoring event.

6. The method of claim 1, wherein the automated remedial action comprises one or more of:

blocking an Internet Protocol (IP) address, blacklisting the IP address, or isolating an affected device.

7. The method of claim 1, further comprising:

determining, based on the third feature set, feedback data, wherein the feedback data represents a link between a first identifier and a second identifier associated with an entity; and providing the feedback data to the first monitoring system and the second monitoring system.

8. The method of claim 1, further comprising:

determining, based on the third feature set, feedback data, wherein the feedback data represents an adjustment to a detection threshold used by the first monitoring system and the second monitoring system, and wherein the detection threshold is a value that defines when particular monitoring data are determined to indicate anomalous activity; and providing the feedback data to the first monitoring system and the second monitoring system, wherein the first monitoring system is configured to adjust the detection threshold based on the feedback data.

9. A system comprising one or more processors and one or more computer-readable media storing computer-executable instructions that, when executed by the one or more processors, cause the one or more processors to perform operations comprising:

receiving monitoring data, wherein:

the monitoring data comprises a first monitoring event, a second monitoring event, and a third monitoring event associated with a computing system, the first monitoring event is received from a first monitoring system, the second monitoring event is received from a second monitoring system, and the third monitoring event is received from a third monitoring system;

at least one of the first monitoring system, the second monitoring system, or the third monitoring system comprises a component selected from a group consisting of an endpoint detection and response system, an intrusion detection and response system, an intrusion prevention system, a firewall, and an email security system, and the monitoring data is stored on a storage medium associated with the computing system;

processing the monitoring data using a multi-stage architecture comprising a first stage associated with a first predictive model and a second stage associated with a second predictive model, wherein, at each stage of a plurality of stages of the multi-stage architecture, intermediate data used by the stage are discarded to minimize storage requirements associated with the multistage architecture, and wherein processing the monitoring data using the multi-stage architecture comprises:

providing the monitoring data to the first predictive model, wherein the first predictive model is configured to process the monitoring data to determine:

that the first monitoring event and the second monitoring event are security-related while the third monitoring event is not security-related, and a first feature set that is associated with the first monitoring event and a second feature set that is associated with the second monitoring event;

receiving, from the first predictive model, the first feature set and the second feature set;

based on receiving the first feature set and the second feature set, storing the first feature set and the second feature set on the storage medium, and removing the monitoring data from the storage medium;

providing the first feature set and the second feature set to a second predictive model, wherein the second predictive model is configured to process the first feature set and the second feature set to determine:

that the first feature set and the second feature set relate to a first threat, and a third feature set that is associated with the first threat;

receiving, from the second predictive model, the third feature set;

based on receiving the third feature set, storing the third feature set on the storage medium, and removing the first feature set and the second feature set from the storage medium;

determining, based on the third feature set, an automated remedial action associated with the computing system; and executing the automated remedial action.

10. The system of claim 9, wherein:

a third predictive model is configured to process the third feature set and a fourth feature set that is associated with a second threat to determine a fifth feature set associated with a first alert;

the first alert is associated with the first threat and a second threat;

the second threat is associated with a fourth monitoring event and a fifth monitoring event of the computing system; and the operations further comprise:

receiving, from the third predictive model, the fifth feature set; and providing the fifth feature set to a fourth predictive model.

11. The system of claim 10, wherein the fourth predictive model is configured to determine the automated remedial action based on the fifth feature set.

12. The system of claim 10, wherein:

the first feature set and the second feature set are associated with a first template; and the third feature set and the fourth feature set are associated with a second template that is different from the first template.

13. The system of claim 9, wherein the third feature set comprises a first identifier of the first monitoring event and a second identifier of the second monitoring event.

14. One or more non-transitory computer-readable media storing computer-executable instructions that, when executed by one or more processors, cause the one or more processors to perform operations comprising:

receiving monitoring data, wherein:

the monitoring data comprises a first monitoring event, a second monitoring event, and a third monitoring event associated with a computing system, the first monitoring event is received from a first monitoring system, the second monitoring event is received from a second monitoring system, and the third monitoring event is received from a third monitoring system;

at least one of the first monitoring system, the second monitoring system, or the third monitoring system comprises a component selected from a group consisting of an endpoint detection and response system, an intrusion detection and response system, an intrusion prevention system, a firewall, and an email security system, and the monitoring data is stored on a storage medium associated with the computing system;

processing the monitoring data using a multi-stage architecture comprising a first stage associated with a first predictive model and a second stage associated with a second predictive model, wherein, at each stage of a plurality of stages of the multi-stage architecture, intermediate data used by the stage are discarded to minimize storage requirements associated with the multistage architecture, and wherein processing the monitoring data using the multi-stage architecture comprises:

providing the monitoring data to a first predictive
model, wherein the first predictive model is config-
ured to process the monitoring data to determine:
that the first monitoring event and the second moni-
toring event are security-related while the third
monitoring event is not security-related, and
a first feature set that is associated with the first
monitoring event and a second feature set that is
associated with the second monitoring event;
receiving, from the first predictive model, the first
feature set and the second feature set;
subsequent to processing the monitoring data by the
first predictive model and determination of the first
feature set and the second feature set by the first
predictive model based on processing of the moni-
toring data,
storing the first feature set and the second feature set
on the storage medium, and
removing the monitoring data from the storage
medium;
providing the first feature set and the second feature set
to a second predictive model, wherein the second
predictive model is configured to process the first
feature set and the second feature set to determine:
that the first feature set and the second feature set
relate to a first threat, and
a third feature set that is associated with the first
threat;
receiving, from the second predictive model, the third
feature set;
subsequent to processing the first feature set and the
second feature set by the second predictive model
and determination of the third feature set by the
second predictive model based on processing of the
first feature set and the second feature set, and prior
to processing of the third feature set by a third
predictive model,
storing the third feature set on the storage medium,
and removing, by the second predictive model, the first
feature set and the second feature set from the
storage medium;
determining, based on the third feature set, an auto-
mated remedial action associated with the computing
system; and
executing the automated remedial action.

15. The one or more non-transitory computer-readable
media of claim 14, wherein:
the third predictive model is configured to process the
third feature set and a fourth feature set associated with
a second threat to determine a fifth feature set associ-
ated with a first alert;
the first alert is associated with the first threat and a
second threat;
the second threat is associated with a fourth monitoring
event and a fifth monitoring event of the computing
system; and
the operations further comprise:
receiving, from the third predictive model, the fifth
feature set; and
providing the fifth feature set to a fourth predictive
model.

16. The one or more non-transitory computer-readable
media of claim 15, wherein the fourth predictive model is
configured to determine the automated remedial action
based on the fifth feature set.

17. The one or more non-transitory computer-readable
media of claim 15, wherein:
the first feature set and the second feature set are associ-
ated with a first template; and
the third feature set and the fourth feature set are associ-
ated with a second template that is different from the
first template.

18. The one or more non-transitory computer-readable
media of claim 14, wherein the third feature set comprises
a first identifier of the first monitoring event and a second
identifier of the second monitoring event.

* * * * *